United States Patent [19]

Freitag et al.

[11] 4,404,363
[45] Sep. 13, 1983

[54] SEPARATION OF DIPHASIC MIXTURES CONTAINING AROMATIC POLYESTERS

[75] Inventors: Dieter Freitag; Volker Serini, both of Krefeld; John Goossens, Cologne; Ludwig Bottenbruch, Krefeld; Uwe Hucks, Alpen, all of Fed. Rep. of Germany

[73] Assignee: Bayer Aktiengesellschaft, Leverkusen, Fed. Rep. of Germany

[21] Appl. No.: 371,532

[22] Filed: Apr. 26, 1982

[30] Foreign Application Priority Data

May 2, 1981 [DE] Fed. Rep. of Germany ....... 3117367

[51] Int. Cl.$^3$ .............................................. C08G 63/74
[52] U.S. Cl. .................................... 528/486; 252/358; 528/487; 528/491; 528/492
[58] Field of Search ............... 528/486, 487, 491, 492; 252/358

[56] References Cited

U.S. PATENT DOCUMENTS

| | | | |
|---|---|---|---|
| 3,216,970 | 11/1965 | Conix | 528/179 |
| 3,351,624 | 11/1967 | Conix | 528/173 |
| 4,156,069 | 5/1979 | Prevorsek et al. | 528/176 |

*Primary Examiner*—Stanford M. Levin
*Attorney, Agent, or Firm*—Connolly and Hutz

[57] ABSTRACT

Diphasic mixtures obtained from the synthesis of aromatic polyesters by the diphasic interface process may be separated into an aqueous phase and an organic phase by the addition of selected compounds.

10 Claims, No Drawings

SEPARATION OF DIPHASIC MIXTURES CONTAINING AROMATIC POLYESTERS

This invention relates to the separation of diphasic mixtures obtained from the synthesis of aromatic polyesters by the diphasic interface process into an aqueous phase and an organic phase.

"Aromatic polyesters" in the context of this invention are thermoplastic polyesters obtained from aromatic dihydroxy compounds and iso and/or terephthalic acid dichlorides in which up to 50 mol percent of the ester groups may be replaced by carbonate groups. The polyester carbonates included in this definition will also be referred to hereinafter as "polyesters".

Aromatic polyesters and diphasic interface processes for their prepratation, in which iso and/or terephthalic acid dichlorides in a water-immiscible organic solvent and diphenols in an aqueous-alkaline solution are reacted together, usually in the presence of catalysts, are known (French Pat. No. 1,177,517, U.S. Pat. Nos. 3,216,970 and 3,351,624 and European patent application No. 2130; J. Polm. Sci. USSR, Vol. 9, 1705-1711 (1967)). Isolation of the aromatic polyesters formed is often made difficult or impossible by the fact that little or no phase separation occurs at the end of the reaction and/or after washing of the organic phase, so that emulsions are formed.

Washing is necessary in order to obtain the polyester free from electrolytes since electrolytes such as salts, acids and bases would damage the polyester when it is subsequently worked up.

It has already been proposed to precipitate the aromatic polyesters and then wash them (U.S. Pat. No. 4,156,069), but this is highly uneconomical owing to the complicated process required.

Methods for separating emulsions are known to the skilled person: see Methoden der Organischen Chemie (Houben Weyl), 4th Edition, Vol. I/1, 213-211, Georg Thieme Verlag, Stuttgart, 1958. The methods recommended include, inter alia, the addition of de-emulsifiers, i.e. compounds which by their presence are capable of breaking down emulsions. It has been found in the past that when these de-emulsifiers are used, complete separation of the diphasic systems is generally ensured if the exact quantity of additive required is used. Smaller quantities do not break down the emulsion while larger quantities result in the reverse type of emulsion (thus an oil-in-water emulsion is broken down into a water-in-oil emulsion).

It has now surprisingly been found that some compounds are eminently suitable as de-emulsifiers for diphasic mixtures which are obtained from the synthesis of aromatic polyesters by the diphasic interface process because, contrary to the observation made with most de-emulsifiers as mentioned above, their effect does not significantly depend upon the quantity in which they are added.

The discovery of the de-emulsifiers mentioned above is of major technical importance because fluctuations in the reaction conditions which are accompanied by fluctuations in the formation of emulsions are generally unavoidable in the production of polyesters, so that the conventional methods of de-emulsification described above are unsuccessful. Using the above-mentioned de-emulsifiers entails a saving in considerable quantities of raw materials and time and in many cases is the precondition for enabling production of the polyester to be achieved at all.

The present invention thus provides a process for the separation of diphasic mixtures obtained from the synthesis of aromatic polyesters by the diphasic interface process into an aqueous phase and an organic phase, characterised in that the following are added to the diphasic mixture which is required to be separated:

A. 10-10,000 ppm, preferably 100-1,000 ppm, based on the weight of aqueous phase, of at least one ammonium compound having at least one quaternary nitrogen atom per molecule, which carries as substituents one or two long-chained hydrocarbon groups having 6-40 C-atoms, preferably 7 to 24 C-atoms, and two or three short-chained hydrocarbon groups having less than 6 C-atoms, preferably less than 4 C-atoms, and in which two short-chained hydrocarbon groups together with the nitrogen atom may constitute an imidazolinyl, pyridyl or oxazolinyl group, and/or the long-chained hydrocarbon groups may be interrupted by one or two, preferably one, sulphonyl amino group ($-SO_2NH-$), and, where more than one quaternary nitrogen atom is present, the nitrogen atoms may be linked by a hydroxyalkylene group, or B. 0.1-1,000 ppm, preferably 5 to 100 ppm, based on the weight of the aqueous phase, of at least one water-soluble anionic organic polymer having an average molecular weight $\overline{M}_w$ of 2,000-5,000,000, preferably 4,000-2,000,000. in particular 10,000-1,000,000, and carboxyl, sulpho, acid phosphate or acid sulphate groups and/or water-soluble salts thereof corresponding to a charge density of from 0.0005-0.02. preferably from 0.001-0.01.

Examples of compounds A and B are described in Ullman's Encyklopädie der technischen Chemie, 4th Edition, Vol. 10, 449-473, Verlag Chemie, Weinheim 1975, and in McCutcheon's "Detergents & Emulsifiers", McCutcheon Division MC Publishing Co., Glen Rock, N.J. (1979).

A preferred class of compounds are those compounds A in which at least one of the long-chained hydrocarbon substituents on the nitroen atoms contains at least one sulphonyl amino group, but the compounds A should preferably not contain carbonamide groups.

Particularly preferred compounds A are the benzyl dodecyl dimethyl salts and cetyl trimethyl ammonium salts, cetyl pyridinium salts, alkyl imidazolinium salts, alkyl oxazolinium salts and ammonium salts having the following structures:

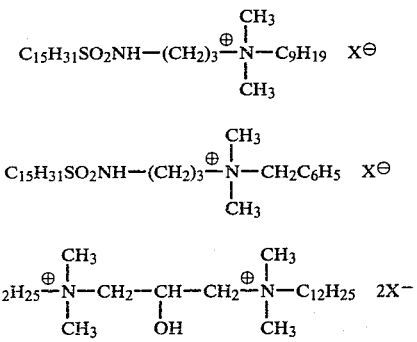

wherein $X^-$ denotes an anion, preferably a halide, e.g. bromide or chloride.

Preferred compounds B are: carboxymethyl cellulose, poly(meth)acrylic acid, alginates, organic polyphosphoric acid ester anhydrides (e.g. polymetaphosphoric acid esters), polystyrene sulphonic acid and polystyrene sulphonate and the corresponding derivatives with $C_1$–$C_3$ alkyl substituents in the nucleus, polyvinyl sulphate, lignin sulphonate, cellulose sulphate, sulphonated aromatic formaldehyde condensates (e.g. sulphonated Novolaks), condensed naphthalene sulphonate and polybenzyl sulphonates. Alginates, sulphonic acids, sulphonates and sulphates are particularly preferred.

The compounds B may be used in the form of the free acids or as their salts, provided they are water-soluble. Any ion capable of forming a water-soluble salt may function as a cation; alkali metal, alkaline earth metal and ammonium salts are generally preferred, in particular the lithium, potassium, sodium and ammonium salts.

The term "charge density" means the quotient of the number of moles of carboxyl, sulpho, acid phosphate or acid sulphate groups or the corresponding salts thereof per g of compound B. Methods of determining the charge density are known in principle: see A. S. Michaels and O. Morelos, Ind, Eng. Chem. 47, 1801 (1955); S. Kawamura and Y. Tanaka, Water and Sewage Works 114, 324 (1967); A. C. Zettlemoyer, F. J. Micale and R. L. Dole, NCASI, Techn. Bull, 225, Dec. 1968.

Within the permissible range of charge densities, the following applies. Compounds B with low molecular weights should have high charge densities. Compounds B with relatively high molecular weights may have either low or high charge densities. High charge densities generally give better results.

The separation of alkali metal hydroxide, catalysts and the salts produced, which is necessary at the end of the polyester synthesis, is generally carried out according to the following scheme:
1. Separation of the alkaline diphasic mixture by leaving it to settle or by centrifuging;
2. Acidification of the organic phase from (1) and separation as under (1); repeat if necessary;
3. Washing of the organic phase from (2) with water and separation as under (1); repeat several times if necessary.

It has been found that in stages (1) and (2), separation is generally assisted by compounds A while in stage (3) separation is assisted by compounds B. The effect of the compounds mentioned above is extremely surprising since the only starting material used in the synthesis of the aromatic polyesters which could possibly have an emulsifying effect is the catalyst, which is in most cases a quaternary ammonium or phosphonium compound. However, according to Ullman's Encyklopadie der technischen Chemie, 4th Edition, Vol. 10, 453, Verlag Chemie, Weinheim 1975, the addition of a cationic compound to an emulsion stabilised with an anionic emulsifier in most cases leads to rapid breakdown of the emulsion. By analogy, one would expect that the addition of an anionic compound to an emulsion which has been stabilised with a cationic emulsifier would also lead to breakdown of the emulsion. The skilled person would therefore have expected that the addition of cationic compounds in stages (1) and (2) in the presence of a cationic catalyst would impair or even prevent phase separation. Another surprising fact is that the effects of compounds A and B which are added according to the invention are to such a large extent independent of the quantity in which they are added.

The method according to the invention of working up diphasic mixtures of aromatic polyesters is particularly successful if the aromatic polyesters are prepared from at least one diphenol corresponding to the formula:

$$HO-\bigcirc-Y-\bigcirc-OH \qquad (II)$$

wherein
Y denotes a single bond, an alkylene or alkylidene group having 1–7 C-atoms, a cycloalkylene or cycloalkylidene group having 5–12 C-atoms, —O—, —S—, $$-\underset{\underset{O}{\|}}{S}-, \; -SO_2-, \; \text{or} \; -\underset{\underset{O}{\|}}{C}-,$$

and/or their derivatives alkylated or halogenated in the nucleus, preferably from at least one diphenol taken from the following group:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
α,α'-bis-(hydroxyphenyl)-diisopropyl benzenes,
and their derivatives which are alkylated or halogenated in the nucleus, in particular at least one diphenol from the group:
2,2-bis-(4-hydroxyphenyl)-propane,
bis-(4-hydroxyphenyl)-sulphide,
1,1-bis-(4-hydroxyphenyl)-cyclohexane,
α,α'-bis-(4-hydroxyphenyl)-p-diisopropyl benzene,
2,2-bis-(3-methyl-4-hydroxyphenyl)-propane,
2,2-bis-(3,5-dichloro-4-hydroxyphenyl)-propane, and
2,2-bis-(3,5-dibromo-4-hydroxyphenyl)-propane.

Particularly preferred aromatic polyesters are those in which at least 50 mol percent, preferably at least 85 mol percent, of the diphenol component consists of residues of 2,2-bis-(4-hydroxyphenyl)-propane.

The percentages given in the following Examples are percentages by weight.

EXAMPLES

Example 1

Aromatic polyesters of bisphenol-A, iso- and terephthalic acid dichloride, organic phase separated under alkaline conditions 4.56 kg of bisphenol-A are dissolved in 3.79 kg of 45% sodium hydroxide solution and 38.6 kg of distilled water. 100 g of triethyl benzyl ammonium chloride, 16 kg of methylene chloride and 9.5 kg of chlorobenzene are then added. A solution of 4.172 kg of a mixture of equal parts of iso- and terephthalic acid dichloride and of 226.6 g of p-isooctyl phenol in 6 kg of methylene chloride is added drop-wise at room temperature into the vigorously stirred diphasic mixture in the course of 20 minutes. Stirring is then continued for 1 hour at room temperature.

An emulsion is formed. The emulsion cannot be sharply separated into an organic and aqueous phase when it is simply left to stand, or when it is left to stand and the organic phase is further diluted with methylene chloride or the aqueous phase is diluted with water, or when the emulsion is centrifuged intermittently or continuously, or when it is acidified. Whichever of these methods is used in an attempt to separate the phases, emulsified intermediate layers of aqueous and organic phase which cannot be separated are formed.

According to the invention, by contrast, the emulsion completely separates into an organic and aqueous alkaline phase when left to stand or centrifuged if 11 g of a 50% aqueous benzyl dodecyl-dimethyl-ammonium chloride solution is added after the emulsion has been stirred for one hour.

The same result is obtained if 20 g of a 50% aqueous solution of

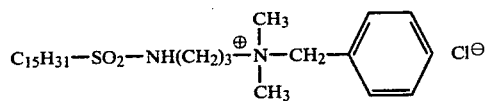

or 25 g of a 50% aqueous solution of:

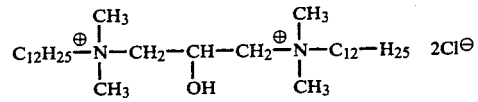

are added after one hours stirring.

Example 2

Aromatic polyesters of bisphenol-A, iso- and terephthalic acid dichloride, organic phase separated under acid conditions 4.56 kg of bisphenol-A are dissolved in 3.79 kg of 45% sodium hydroxide and 112 kg of distilled water. 100 g of triethyl benzyl ammonium chloride, 32 kg of methylene chloride and 25.8 kg of chlorobenzene are then added. A solution of 4.172 kg of a mixture of equal parts of iso-and terephthalic acid dichloride and of 226.6 g of p-iso-octyl phenol in 6 kg of methylene chloride is added drop-wise at room temperature into the vigorously stirred diphasic mixture in the course of 20 minutes. Stirring is then continued for one more hour at room temperature.

After the organic phase has been separated, it is acidified with 100 liters of 2% aqueous phosphoric acid for further working up. This results in the formation of an emulsion which cannot break down either when left to stand or when centrifuged.

If, on the other hand, addition of the aqueous phosphoric acid is accompanied by the addition of 12 g of a 50% aqueous solution of

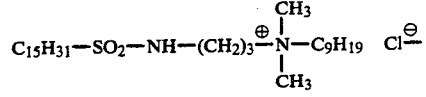

sharp separation of the two phases is obtained when the emulsion is left to stand or centrifuged.

Example 3

Washing with water of the organic phase which has been separated after acidification The organic phase which may be separated from the reaction mixtures of Examples 1 and 2 after acidification may be washed with distilled water without formation of an emulsion until a pH of approximately 4 is reached. When the pH falls below this critical value, phase separation cannot be achieved either by leaving the emulsion to stand or by dilution with water or methylene chloride or by centrifuging.

No emulsion is formed if one of the following substances is added to the wash water:
(a) 10 ppm of polystyrene sulphonic acid,
(b) 2.5 ppm of polyvinyl sulphate, K salt,
(c) 10 ppm of polystyrene sulphonic acid, Na salt,
(d) 10 ppm of lignin sulphonate, Na salt,
(e) 50 ppm of alginate, Na salt,
(f) 50 ppm of carboxymethyl cellulose, Na salt,
(g) 75 ppm of 2-ethylhexyl-polyphosphoric acid ester anhydride, K salt,
(h) 50 ppm of condensed naphthalene sulphonate, Na salt,
(i) 75 ppm of cellulose sulphate, Na salt.

The quantities given above are based on the quantity of distilled water added.

Charge densities and the quantities of additive (based on wash water) which may be used to remove the emulsion are given below:

| Additive | Charge Density | Quantity added [ppm] |
| --- | --- | --- |
| a | 0.005 | 5–100 |
| b | 0.008 | 2.5–100 |
| c | 0.004 | 5–100 |
| d | 0.0015 | 5–100 |
| e | 0.002 | 5–250 |
| f | 0.004 | 25–100 |
| g | 0.003 | 25–100 |
| h | 0.002 | 10–100 |
| i | 0.003 | 2.5–100 |

We claim:
1. A process for the separation of diphasic mixtures obtained from the synthesis of aromatic polyesters by the diphasic interface process into an aqueous and an organic phase, characterised in that the following are added to the diphasic mixture which is required to be separated:
A. 10–10,000 ppm, based on the weight of the aqueous phase, of at least one ammonium compound containing at least one quaternary nitrogen atom per molecule, which nitrogen atom carries as substituents one or two long-chained hydrocarbon groups having 6–40 C-atoms and two or three short-chained hydrocarbon groups having less than 6 C-atoms,
and in which two short-chained hydrocarbon groups together with the nitrogen atom may form an imidazolinyl, pyridyl or oxazolinyl group, and/or,
the long-chained hydrocarbon groups may be interrupted by 1–2 sulphonyl amino groups (—SO$_2$NH—) and, where more than one quaternary nitrogen atom is present, the nitrogen atoms may be linked by a hydroxyalkylene group, or
B. 0.1–1,000 ppm, based on the weight of the aqueous phase, of at least one water-soluble anionic organic polymer having an average molecular weight $\overline{M}_w$ of 2,000–5,000,000 and carboxyl, sulpho, acid phosphate or acid sulphate groups and/or their water-soluble salts corresponding to a charge density of from 0.0005–0.02.

2. A process according to claim 1, characterised in that the ammonium compounds A are added in a quantity of from 100–1,000 ppm, based on the weight of the aqueous phase.

3. A process according to claim 1 characterised in that the long-chained hydrocarbon groups attached to the nitrogen atom of the ammonium compounds A have from 7 to 24 C-atoms.

4. A process according to claim 1, characterised in that the polymers B are added in a quantity of from 5–100 ppm, based on the weight of the aqueous phase.

5. A process according to claim 1, characterised in that the polymers B have an average molecular weight $\overline{M}_w$ of from 4,000–2,000,000.

6. A process according to claim 1, characterised in that the polymers B have an average molecular weight $\overline{M}_w$ of from 10,000–1,000,000.

7. A process according to claim 1, characterised in that the polymers B have a charge density of from 0.001–0.01.

8. A process according to claim 1, characterised in that the polymers B are selected from the group comprising carboxymethyl cellulose, poly(meth)acrylic acid, alginates, complex organic polyphosphoric acid ester anhydrides, polystyrene sulphonic acid and sulphonate, polyvinyl sulphate, lignin sulphate, cellulose sulphate, and sulphonated aromatic formaldehyde condensates.

9. A process according to claim 1, characterised in that the polymers B are selected from the group comprising alginates, sulphonic acids, sulphonates and sulphates.

10. A process according to claim 1, characterised in that the aromatic polyesters contain at least 85 mol percent, based on the diphenol groups, of residues of bisphenol-A or o,o,o′,oÄ-tetramethyl-bisphenol-A.

* * * * *